(12) United States Patent
Winkler et al.

(10) Patent No.: US 7,016,994 B2
(45) Date of Patent: Mar. 21, 2006

(54) RETRY MECHANISM FOR BLOCKING INTERFACES

(75) Inventors: Joerg Winkler, Ullersdorf (DE); Frank Barth, Radebeul (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 343 days.

(21) Appl. No.: 10/285,935

(22) Filed: Nov. 1, 2002

(65) Prior Publication Data

US 2004/0024949 A1 Feb. 5, 2004

(30) Foreign Application Priority Data

Jul. 31, 2002 (DE) .................. 102 34 992

(51) Int. Cl.
*G06F 13/14* (2006.01)

(52) U.S. Cl. .............. 710/105; 710/311; 710/313; 710/315; 710/305

(58) Field of Classification Search .............. 710/306, 710/308, 310–311, 313, 315
See application file for complete search history.

(56) References Cited

U.S. PATENT DOCUMENTS

| | | | | |
|---|---|---|---|---|
| 4,785,394 | A * | 11/1988 | Fischer ................... | 710/114 |
| 5,764,929 | A * | 6/1998 | Kelley et al. ............. | 710/107 |
| 5,850,530 | A | 12/1998 | Chen et al. | |
| 5,870,567 | A * | 2/1999 | Hausauer et al. ......... | 710/310 |
| 6,108,738 | A * | 8/2000 | Chambers et al. ........ | 710/113 |
| 6,199,131 | B1 * | 3/2001 | Melo et al. ............... | 710/107 |
| 6,247,086 | B1 * | 6/2001 | Allingham ................ | 710/314 |
| 6,301,630 | B1 * | 10/2001 | Chen et al. ............... | 710/310 |
| 6,381,667 | B1 * | 4/2002 | Brown ..................... | 710/313 |
| 6,385,686 | B1 * | 5/2002 | Brown ..................... | 710/313 |
| 6,405,276 | B1 * | 6/2002 | Chen et al. ............... | 710/310 |
| 6,473,791 | B1 * | 10/2002 | Al-Ghosein et al. ...... | 709/217 |
| 6,625,683 | B1 | 9/2003 | Khan et al. | |
| 6,754,734 | B1 * | 6/2004 | Goode et al. ............. | 710/24 |
| 6,757,798 | B1 * | 6/2004 | Tetrick .................... | 711/163 |
| 2001/0021967 | A1 * | 9/2001 | Tetrick .................... | 711/163 |

(Continued)

FOREIGN PATENT DOCUMENTS

EP    0665500    10/2001

OTHER PUBLICATIONS

"Chip connects HyperTransport bus to PCI"; Electronicstalk; Apr. 6, 2001; available online at <http://www.electronicstalk.com/news/api/api101.html>.*

(Continued)

*Primary Examiner*—Paul R. Myers
*Assistant Examiner*—Ryan Stiglic
(74) *Attorney, Agent, or Firm*—Meyertons Hood Kivlin Kowert & Goetzel, P.C.; B. Noël Kivlin (57) ABSTRACT

An improved interface technology is provided that may be applied to PCI (Peripheral Component Interconnect) devices connected to a southbridge. Requests are received from at least one requestor. The request require responses to be sent back to the respective requestor. The requests are placed by the respective requestor by asserting a request signal, and the request signal is deasserted by the respective requestor when a response is sent back. A retry request may be sent to the current requestor for requesting the current requestor to deassert its request signal although a response has not yet been sent back, and to reassert the request signal later. Together with the retry request, a ready signal is sent indicating whether the request could be processed. This allows the requestor to modify its request when retrying it, if the request was not yet processed.

58 Claims, 7 Drawing Sheets

U.S. PATENT DOCUMENTS

2002/0078282 A1 * 6/2002 Drerup et al. .............. 710/107

OTHER PUBLICATIONS

Bailey, Chris; "AMD Announces Texas Instruments Licenses Next-Generation HyperTransport™"; HyperTransport™ Consortium; Nov. 7, 2001; available online at <http://www.hypertransport.org>.*

Api Networks; "AP1011 HyperTransport™-to-PCI I/O Bridge"; Api Networks; no date given.*

HyperTransport™ Technology Consortium; HyperTransport™ Link I/O Specificaiton; HyperTransport™ Technology Consortium; Oct. 10, 2001; revision 1.03; pp. 17-18.*

PCI Special Interest Group; "PCI Local Bus Specification"; PCI Special Interest Group; Dec. 18, 1998; Revision 2.2; pp. 61-67.*

* cited by examiner

RETRY MECHANISM FOR BLOCKING INTERFACES

BACKGROUND OF THE INVENTION

1. Field of the Invention

The invention generally relates to integrated circuit chips and corresponding methods and devices, and in particular to interfaces that can be used to place requests that require responses.

2. Description of the Related Art

Integrated circuit chips are often used for data processing and are known to comprise a number of different circuit units. Generally, each circuit unit is for performing a specific function and of course, there may be different circuit units provided on one chip for performing the same function, or performing different functions. The circuit units may operate sequentially in time or simultaneously, and they may function independently from each other, or dependent on the operation of other circuit units.

In the latter case, the circuit units are usually interconnected via an interface to allow the circuit units to interchange data needed for making the operation of one circuit unit dependent on the operation of the other circuit unit. The data exchange is often done by sending transactions from one circuit unit to the other circuit unit. A transaction is a sequence of packets that are exchanged between the circuit units and that result in a transfer of information. The circuit unit initiating a transaction is called the source (or master), and the circuit unit that ultimately services the transaction on behalf of the source is called target. It is to be noted that there may also be intermediary units between the source and the target.

Transactions may be used to place a request, or to respond to a received request. Taking the requests, there may be distinguished posted request from non-posted requests, dependent on whether the request requires a response. Specifically, a non-posted request is a request that requires a response while a posted request does not require a response.

When focusing on the functions which are performed by the interconnected circuit units, the circuit units can often be divided into hosts and devices. The term host then means a circuit unit that provides services to the dependent device. A transaction from the host to the device is said to be downstream while a transaction in the other direction is said to be upstream. In bi-directional configurations, both the host and the device may send and receive requests and responses so that a device may be source as well as target, and also the host may function as source as well as device.

Figure 1:
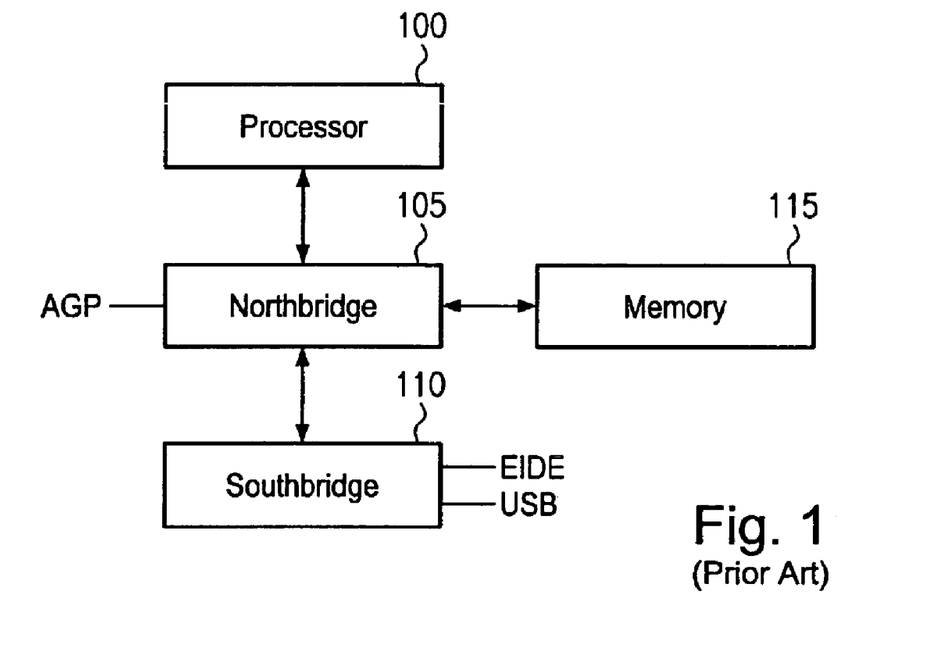
FIG. 1 is a block diagram schematically illustrating the hardware components of a common motherboard layout.

A field where such integrated circuit chips are widely used are personal computers. Referring to FIG. 1, the hardware components of a common motherboard layout are depicted. It is to be noted that this figures shows only one example of a motherboard layout, and other configurations exist as well. The basic elements found on the motherboard of FIG. 1 may include the CPU (Central Processing Unit) 100, a northbridge 105, a southbridge 110, and system memory 115.

The northbridge 105 is usually a single chip in a core-logic chipset that connects the processor 100 to the system memory 115 and, e.g., to the AGP (Accelerated Graphic Port) and PCI (Peripheral Component Interface) buses. The PCI bus is commonly used in personal computers for providing a data path between the processor 100 and peripheral devices like video cards, sound cards, network interface cards and modems. The AGP bus is a high-speed graphic expansion bus that directly connects the display adapter and system memory 115. AGP operates independently of the PCI bus. It is to be noted that other motherboard layouts exist that have no northbridge in it, or that have a northbridge without AGP or PCI options.

The southbridge 110 is usually the chip in a system core-logic chipset that controls the IDE (Integrated Drive Electronics) or EIDE (Enhanced IDE) bus, controls a USB (Universal Serial Bus) bus that provides plug-and-play support, controls a PCI-ISA (Industry Standard Architecture) bridge, manages the keyboard/mouse controller, provides power management features, and controls other peripherals.

Thus, common personal computers include southbridges 110 which are southbridge 110 and the northbridge 105 are interconnected by the PCI bus acting as system bus so that the northbridge 105 works as host-to-PCI bridge forming a link between the host bus that connects to the processor 100, and the PCI bus whereas the southbridge 110 works as, e.g., PCI-to-ISA bus where the ISA (Industry Standard Architecture) bus is the I/O bus. However, other chipset arrangements exist in which the northbridge 105 operates as memory controller hub and the southbridge 110 as I/O controller hub. In such structures, the northbridge 105 and the southbridge 110 are no longer interconnected by a system bus but by a specific hub interface.

To satisfy the demands for high-speed chip-to-chip communication in such hub interfaces, the HyperTransport™ technology was developed which provides a high-speed, high-performance point-to-point on-board link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy computer buses, to be extensible to new system network architecture buses, to be transparent to operating systems, and to offer little impact on peripheral drivers.

In particular in systems where a high-speed communication is made possible by interfaces such as those according to the HyperTransport technology, a problem may arise when driving low-speed devices. For instance, it may be the task of a HyperTransport-to-PCI bridge to interconnect a PCI compliant interface and a HyperTransport compliant interface. The PCI compliant interface is a low-speed interface that may be blocked by individual PCI devices. Whenever a PCI device places a request, it may assert a request signal on a specific signal line. The HyperTransport-to-PCI bridge will then send a respective request upstream. If the request requires a response, the response data will arrive at the bridge and will be sent to the PCI device. The PCI device then deasserts the request signal when it receives the response.

In such systems, there can be no other request placed in PCI interface unless the response is delivered to the requesting PCI device. That is, the PCI device blocks the PCI interface so that no data transfer takes place in the time between placing the request and sending back the response. Moreover, even the high-speed upstream interface is blocked with respect to any data traffic relating to PCI devices since there can be no PCI related data traffic in the HyperTransport link before receiving the response. This is disadvantageous since the high-speed capabilities of the upstream interface cannot be used efficiently.

SUMMARY OF THE INVENTION

An improved integrated circuit chip and corresponding device and method are provided that may increase the operating speed and improve efficiency in particular where interface technologies are used that may block the data traffic.

In one embodiment, an integrated circuit chip is provided that comprises an interface circuit that is connected to a first signal line for receiving requests from at least one requestor. The requests require responses to be sent back to the respective requestor. The requests are placed by the respective requestor by asserting a request signal on the first signal line. The request signal is deasserted by the respective requestor when a response is sent back to the respective requestor. The integrated circuit chip further comprises a request processing circuit that is connected to process the received requests. The interface circuit is further connected to a second signal line to send a retry request to the current requestor for requesting the current requestor to deassert its request signal although a response has not yet been sent back, and to reassert the request signal later. The interface circuit is further connected to a third signal line to send to the current requestor a ready signal together with the retry request. The ready signal indicates whether the request received from the current requestor could be processed by said request processing circuit.

In another embodiment, there may be provided a HyperTransport-to-PCI bridge that comprises a PCI target interface unit and a HyperTransport source receiving requests from at least one PCI source unit. The requests require responses to be sent back to the respective PCI source unit. The requests are placed by the respective PCI source unit by asserting a request signal on the first signal line. The request signal is deasserted by the respective PCI source unit when a response is sent back to the respective PCI source unit. The HyperTransport source interface unit is connected to send signals corresponding to the received requests to a HyperTransport compliant target device. The PCI target interface unit is further connected to a second signal line to send a retry request to the current PCI source unit for requesting the current PCI source unit to deassert its request signal although a response has not yet been sent back, and to reassert the request signal later. The PCI target interface unit is further connected to a third signal line to send to the current PCI source unit a ready signal together with the retry request. The ready signal indicates whether the request received from the current PCI source unit could be processed by the HyperTransport source interface unit.

In yet another embodiment, a southbridge device for bridging a low-speed data channel to a high-speed data channel in a computer system is provided. The southbridge device comprises a low-speed interface unit that is connected to a first signal line for receiving requests from at least one requestor. The requests require responses to be sent back to the respective requester. The requests are placed by the respective requestor by asserting a request signal on the first signal line. The request signal is deasserted by the respective requestor when a response is sent back to the respective requester. The southbridge device further comprises a high-speed interface unit that is connected to send signals corresponding to the received requests to an upstream target device. The low-speed interface unit is further connected to a second signal line to send a retry request to the current requester for requesting the current requester to deassert its request signal although a response has not yet been sent back, and to reassert the request signal later. The low-speed interface unit is further connected to a third signal line to send to the current requestor a ready signal together with the retry request. The ready signal indicates whether the request received from the current requestor could be processed by the high-speed interface unit.

In a further embodiment, there may be provided a PCI device that comprises a master interface unit connected to a first signal line for sending a request to a PCI target device. The request requires a response. The master interface unit is adapted to place the request by asserting a request signal on the first signal line and deasserting the request signal when the response is received. The master interface unit is further connected to a second signal line to receive a retry request from the PCI target device. The master interface unit is further connected to a third signal line to receive a ready signal from the PCI target device together with the retry request. The ready signal indicates whether the request sent to the PCI target device could be processed by the PCI target device. The master interface unit is capable of deasserting the request signal upon receipt of the retry request although a response has not yet been received, and reasserting the request signal later. The master interface unit is capable of sending a modified request when reasserting the request signal, if the ready signal indicated that the request sent to the PCI target device could not be processed by the PCI target device.

According to still a further embodiment, a method of operating an integrated circuit chip is provided. The method comprises receiving requests from at least one requester. The requests require responses to be sent back to the respective requestor. The requests are placed by the respective requestor by asserting a request signal. The request signal is deasserted by the respective requestor when a response is sent back to the respective requestor. The method further comprises processing the received requests, and sending a retry request to the current requestor for requesting the current requester to deassert its request signal although a response has not yet been sent back, and to reassert the request signal later. The method further comprises sending a ready signal to the current requestor together with the retry request. The ready signal indicates whether the request received from the current requestor could already be processed.

In still a further embodiment, there may be provided a method of operating a PCI device. The method comprises sending a request to a PCI target device by asserting a request signal. The request requires a response. The method further comprises receiving a retry request from the PCI target device, and determining whether to deassert the request signal although a response has not yet been received. If so, the request signal is deasserted and reasserted later. The method further comprises deasserting the request signal when the response is received. In the method, reasserting the request signal comprises determining whether to send a modified request if the ready signal indicated that the request sent to the PCI target device could not be processed by the PCI target device.

According to still another embodiment, a computer system comprises a PCI device and a southbridge that is connected to the PCI device. The PCI device is capable of sending a request to the southbridge by asserting a request signal. The southbridge is capable of sending a response back to the PCI device. The PCI device is arranged to deassert the request signal when receiving the response. The southbridge is further arranged to send a retry request to the PCI device for requesting the PCI device to deassert its request signal although a response has not yet been sent back, and to reassert the request signal later. The southbridge is further arranged to send a ready signal to the PCI device together with the retry request. The ready signal indicates whether the request received from the current requestor could be processed.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and adavantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 2:
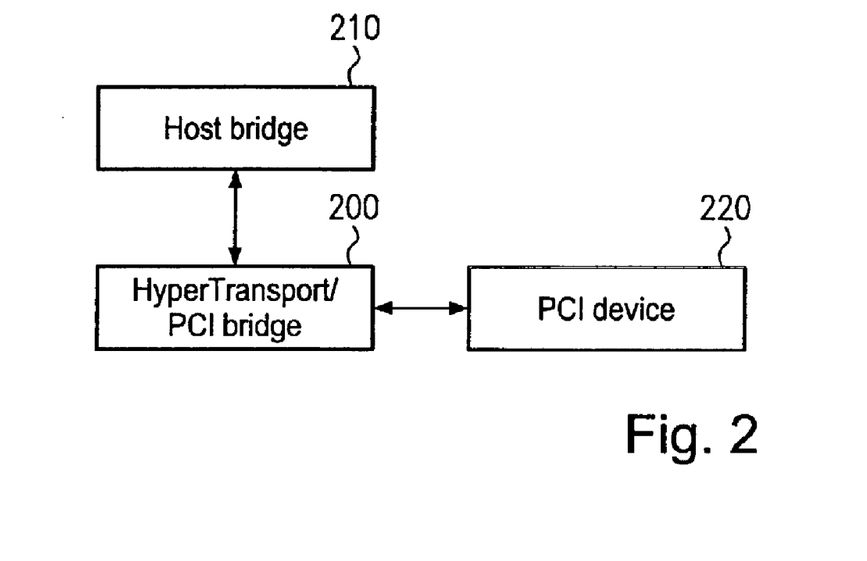
FIG. 2 is a block diagram illustrating components of a computer system according to an embodiment.

Referring now to the drawings and in particular to FIG. 2, the hardware components of a computer system according to an embodiment are depicted. As can be seen from FIG. 2, a HyperTransport-to-PCI bridge 200 is provided that is connected via a HyperTransport compliant interface to a host bridge 210 which is located upstream. Further, the bridge 200 is connected to a PCI device 220 via a PCI compliant interface.

While the present embodiment and the following discussion is based on the configuration shown in FIG. 2, it is to be noted that other embodiments are possible where other low-speed and high-speed interface technologies may be used. Moreover, it is to be noted that the embodiments are not restricted to bridges between low-speed and high-speed channels. Rather, the bridge 200 may be any data processing device that generates responses to incoming requests, and sends the generated responses back to the requestor.

Moreover, it is to be noted that the system of FIG. 2 is depicted in a rather simplified manner since other components may exist in the system that have not been shown explicitly. For instance, the HyperTransport-to-PCI bridge 200 may be incorporated into a southbridge device. Further, there may be more than just one PCI device 220 connected to the bridge 200. Moreover, there may be multiple bus master engines in some or each of the PCI devices, and each bus master engine may separately and independently act on the interface, for instance to place requests.

Figure 3:
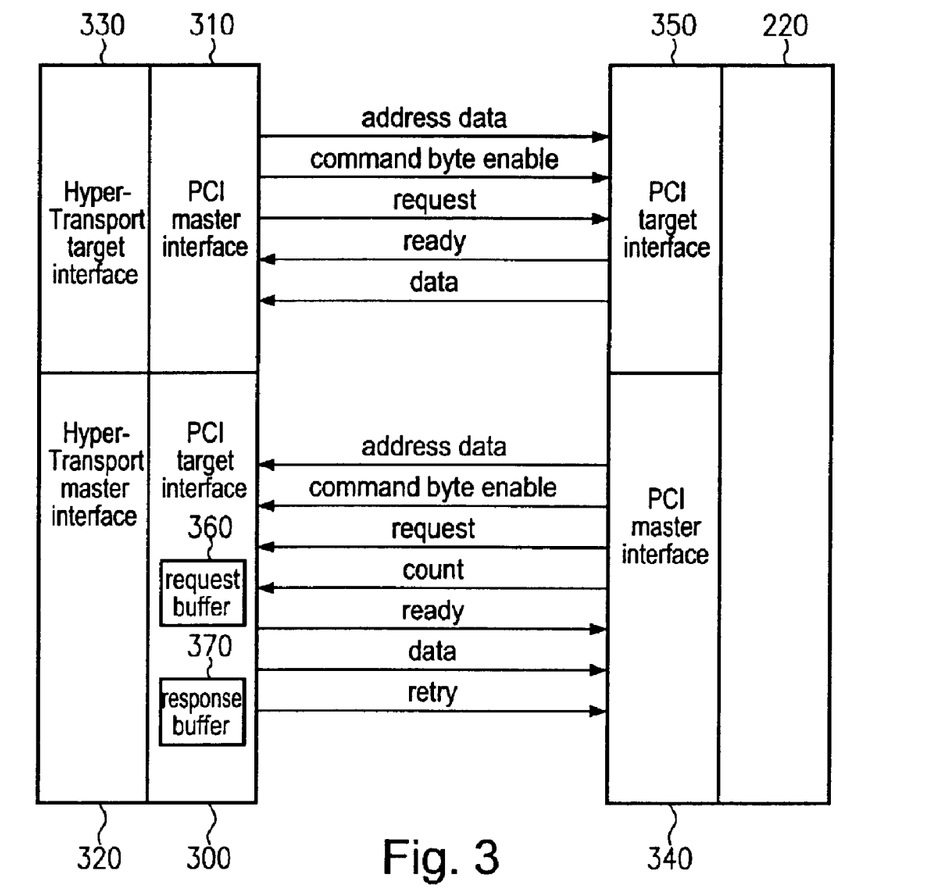
FIG. 3 illustrates the low-speed interface according to an embodiment.

Referring now to FIG. 3, the interface components in the bridge 200, and the PCI device 220 are shown in more detail according to an embodiment. As can be seen from the figure, each of the interfacing entities comprises a PCI master interface 310, 340 and a PCI target interface 300, 350. The PCI device 220 uses its master interface unit 340 for placing upstream requests to the target interface unit 300 of the bridge 200. If the request is followed by a response from the bridge 200, the target interface unit 300 of the bridge 200 may be used to send the response back to the master interface unit 340 of the PCI device 220. On the other hand, the PCI master interface unit 310 of the bridge 200 can be used to place downstream requests to the target interface unit 350 of the PCI device 220, and responses may be sent back to the bridge 200 in substantially the same manner as discussed above, in the other direction.

As apparent from the figure, the HyperTransport-to-PCI bridge 200 further comprises HyperTransport master and target interfaces 320, 330 for handling the data traffic over the HyperTransport link in case of upstream requests and downstream requests, respectively. That is, if an upstream request is placed by the PCI device 220, the request is received in the PCI target interface 300 and processed in the HyperTransport master interface 320 of bridge 200 to send the request upstream. The HyperTransport master interface 320 may further be responsible for receiving responses pertaining to upstream requests.

Discussing now in more detail the PCI interface according to the embodiment shown in FIG. 3, each of the paired master and target interface units are connected by means of a number of signal lines. A request may in each direction be placed by asserting a request signal on the specific signal line. The recipient of the respective request signal may send back a ready signal. Further, there may be a signal line for communicating command and byte enable information.

In the embodiments, when the PCI target interface 300 receives a request from the PCI device 220, it signals, together with the retry request, to the PCI device 220 by means of the ready signal whether the HyperTransport master interface 320 could process the request. The ready signal is set to a high level if the request could be processed, otherwise the ready signal level is low. If the ready signal was low, i.e. the request could not be immediately processed, the PCI device 220 is allowed to modify its request when retrying it. The PCI target interface 300 is adapted to accept modified requests in such circumstances. Modified requests may be requests for another amount of data. For instance, when retrying the request the PCI device 220 can request more data than it did initially. This will improve the overall performance since it allows for combining two or more requests and thus, reduces the traffic volume on the bus.

Requests may be write requests and read requests. In both cases, the requestor may need to communicate addresses and data to the other device, and it may do so using the address data signal line. If the request is followed by a response, the data signal line may be used.

Figure 4:
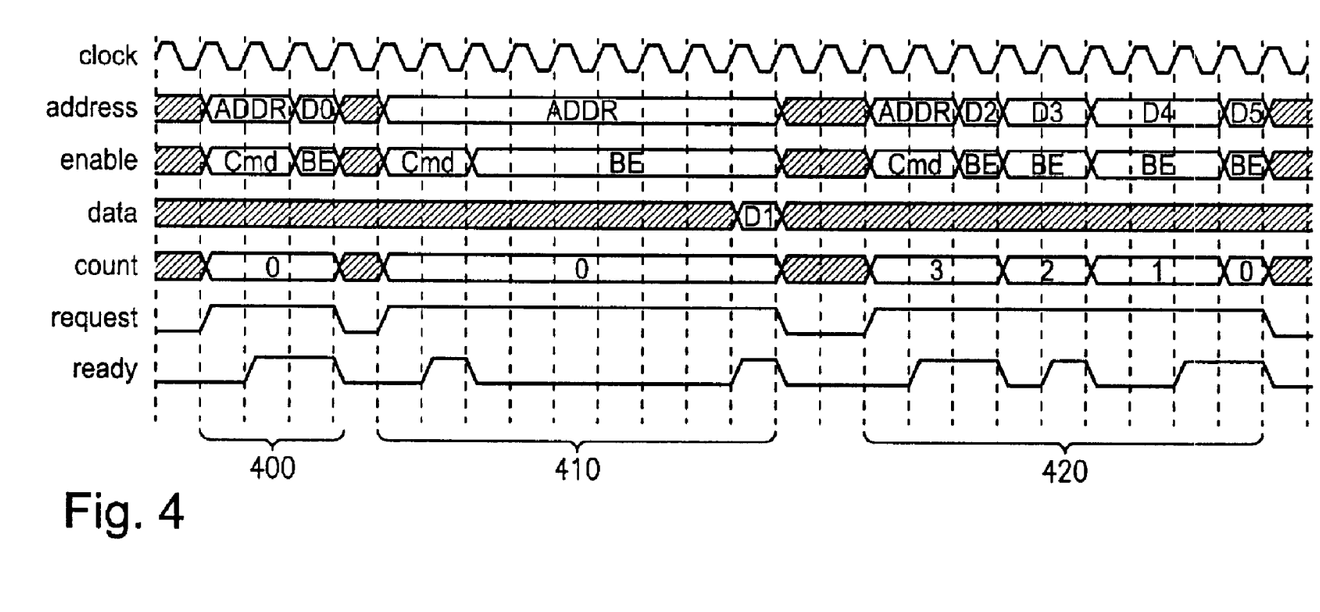
FIG. 4 is a timing chart illustrating write and read transactions in the interface of FIG. 3.

Examples of how write and read transactions may be transferred using the interface of FIG. 3, are illustrated in the timing chart of FIG. 4. First, there is a write transaction transferred in cycle 400. As can be seen from the FIGURE, the address line is used to send an address for locating the memory place to be written to, followed by the data to be written.

In cycle 410, a read transaction is performed. The requester communicates the address to be read from, using the address line. The response to this memory read request is formed by the data sent back at the end of the cycle on the data signal line.

Finally, there is shown in cycle 420 of the timing chart of FIG. 4 how a write transaction with multiple data phases may be processed. The requestor uses the address line for addressing the respective memory location. Further, multiple data phases are sent on the same signal line. As can further be seen from the figure, an additional signal line may be used to count the data phases.

Turning now back to FIG. 3, the interface 300, 340 that may be used for placing upstream requests further comprises a retry signal line. This signal line may be used to allow the PCI target, i.e. the HyperTransport-to-PCI bridge 200 in the present embodiment, to assert a retry request bit during memory read requests. The bus master, i.e. the PCI master interface 340, is allowed to deassert the request signal placed on the request signal line, and to start a new bus master cycle. The master 340 is also allowed to ignore the retry request and keep its request signal active on the request signal line. As will be apparent from the discussion below, this allows to overlap multiple read requests and increase the data throughput.

In general, the retry request signal may allow the next upstream target of the request, e.g. the bridge 200 in the present embodiment, to take that request, send it upstream, and "retry" the requestor. The requestor may, or may not, signal, the requestor may retry the same read request later.

By unblocking the interface, other requesters are allowed to place a request and to get probably also retried. As mentioned above, requesters may be other PCI devices or other bus masters within one and the same PCI device 220.

As shown in FIG. 3, the PCI target interface 300 of the bridge 200 may comprise a request buffer 360 and a response buffer 370. The request buffer 360 may be used to store requests that require responses that have not been sent back. That is, any request that is placed may be stored in the buffer 360 even though the PCI master interface 340 may accept a retry request from the target interface 300. If the PCI master interface 340 retries the same read request later and a response is available, the request is deleted from the buffer 360 at the time the response is sent back to the requestor. For storing responses, the response buffer 370 may be used.

It is to be noted that in other embodiments, the request buffer 360 and/or the response buffer 370 may be located within the HyperTransport master interface 320 of the bridge 200. Further, the buffers may be located at other place within the bridge 200, and the buffers may even be external units.

Figure 5:
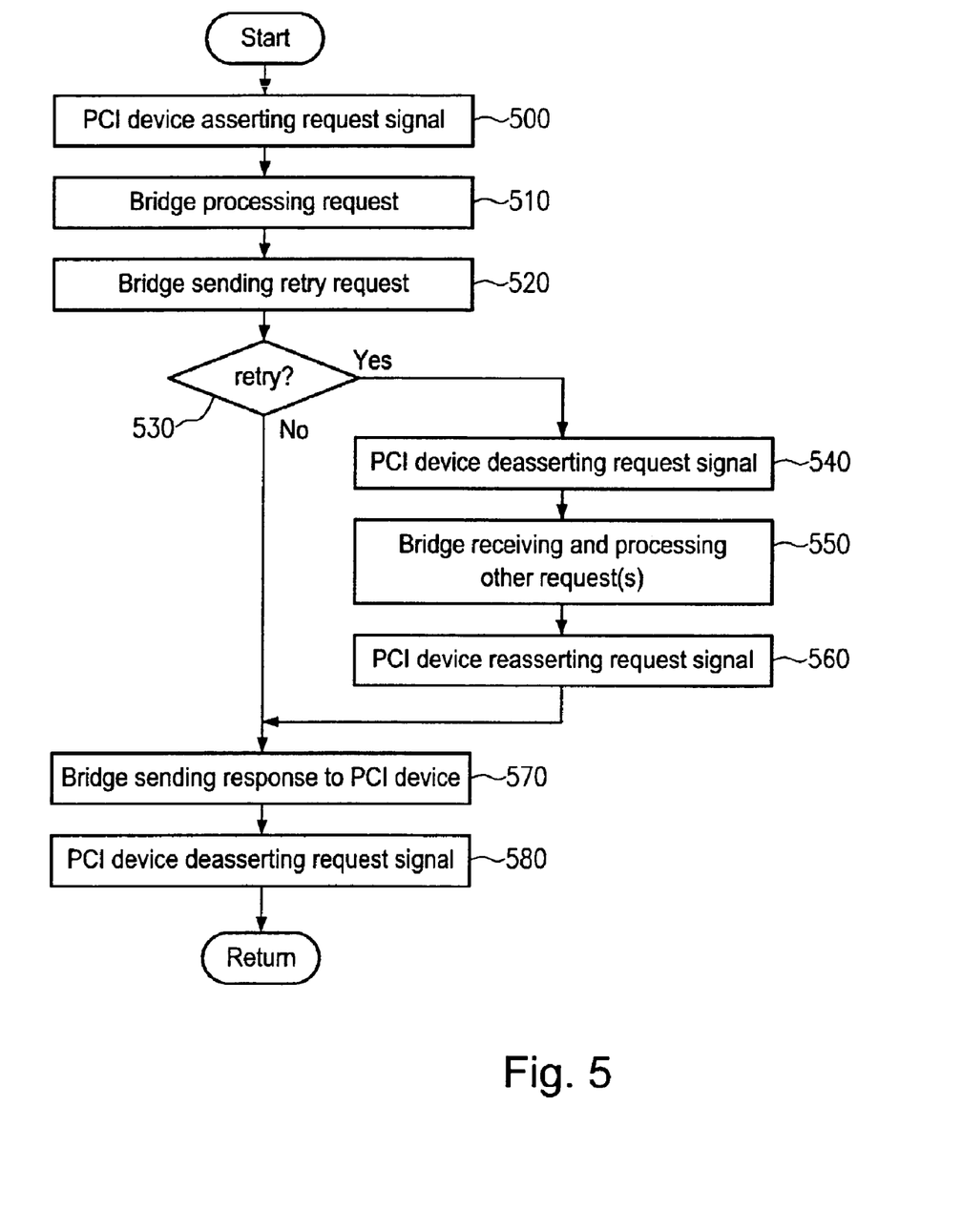
FIG. 5 is a flowchart illustrating the main process of operating the interface shown in FIG. 3, according to an embodiment.

Turning now to FIG. 5 which is a flowchart illustrating an operation process according to an embodiment, the PCI device 220 may initially place an upstream request in step 500 by asserting the request line. The HyperTransport-to-PCI bridge 200 receives the request and processes it in step 510. As mentioned above, processing the request may be done by sending the request upstream to the host bridge 210.

The HyperTransport-to-PCI bridge 200 may then assert the retry request line in step 520. In one embodiment, the bridge 200 may send the retry request whenever it receives a request that requires a response. In another embodiment, the bridge 200 may place the retry request in certain cases only. For instance, placing retry requests may be possible for given requestors only. Alternatively, placing retry requests may be possible for certain kinds of requests only, e.g. for memory read requests. In this case, step 520 may comprise a substep of determining whether the received request is one of those kinds.

Once the retry request is sent to the requestor in step 520, the requestor may determine in step 530 whether it will ignore or accept the retry request. If the requestor decides to ignore the retry request, the process continues with sending the response from the bridge 200 to the requestor in step 570 as soon as it will be available, and deasserting the request signal on the request line by the PCI device 220 in step 580.

If however the PCI device 220 decides in step 530 to accept the retry request, it deasserts its request signal in step 540 to unblock the PCI interface. The interface may then be used in step 550 for other requests. The PCI device 220 may retry its request in step 560 by reasserting the request signal.

Figure 6:
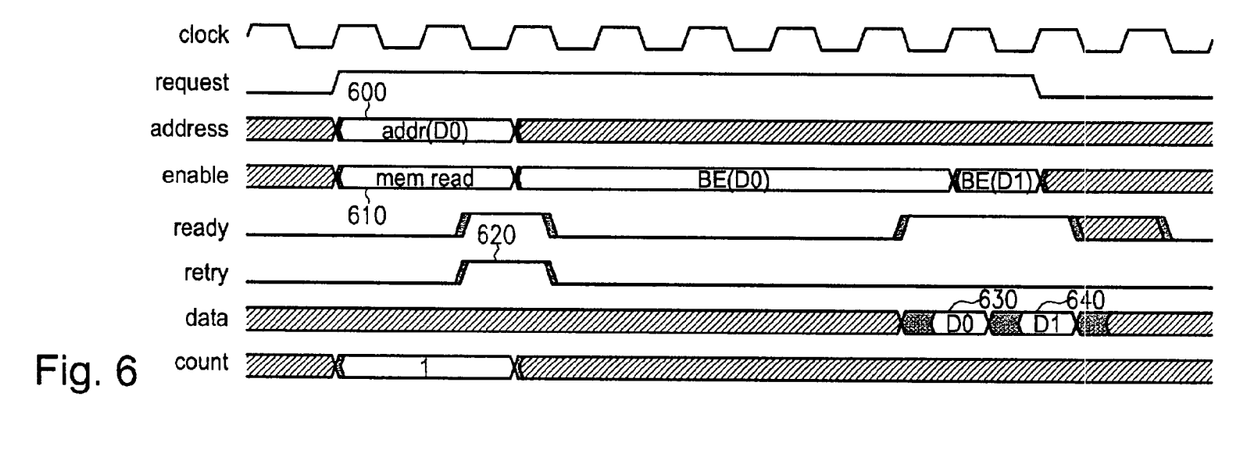
FIG. 6 is a timing chart of a bus master read process according to an embodiment where the retry request is ignored.

Example timing charts for illustrating the retry mechanism of the interface discussed above are given in FIGS. 6 to 8. Turning first to FIG. 6, a bus master read cycle is depicted where the retry request is ignored. The PCI device 220 communicates to the bridge 200 the address 600 where data is to be read from. Further, the PCI device 220 communicates a command identifier 610 to the bridge 200 informing the bridge 200 that the request is a memory read request. The bridge 200 then sends a retry request 620 back to the PCI device 220 but no action is performed by the PCI device 220 in reply thereto. Thus, the interface remains blocked until the read data 630, 640 is available and sent from bridge 200 to the PCI device 220.

Figure 7:
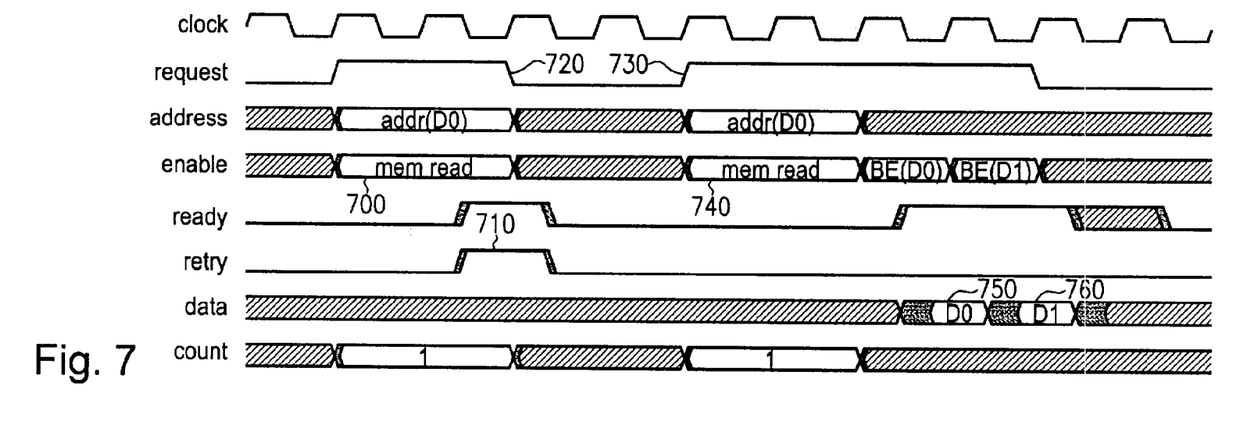
FIG. 7 is a timing chart illustrating a bus master read process according to an embodiment, where the retry request is not ignored and a HyperTransport cycle is launched.

A similar timing chart is depicted in FIG. 7 where a memory read request 700 is placed by the PCI device 220. After the bridge 200 has sent a retry request 710, the PCI device 220 deasserts the request signal 720. The PCI device 220 then reasserts the request signal 730 for once again sending the same read request 740. It is to be noted that the PCI device 220 uses the same count value for retrying the request. As a response is available in the example of FIG. 7, the data 750, 760 is sent from the bridge 200 to the PCI device 220.

Figure 8:
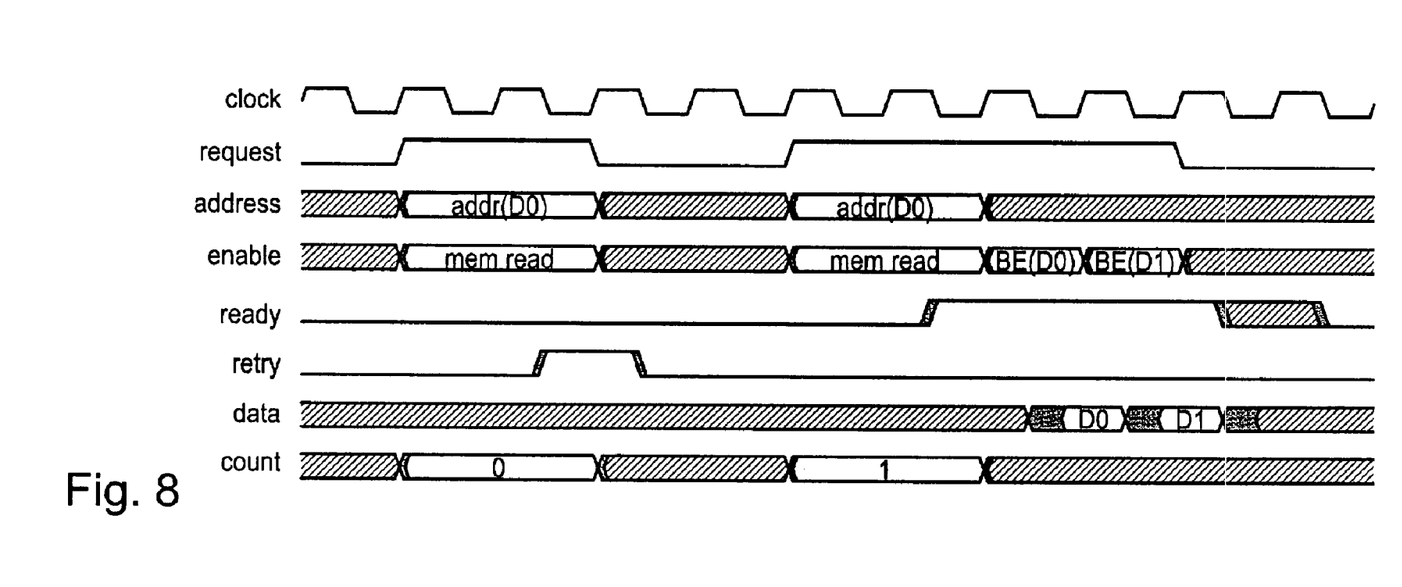
FIG. 8 is a timing chart illustrating a bus master read process according to an embodiment, where the retry request is not ignored and a HyperTransport cycle is not launched.

Turning now to FIG. 8, this timing chart differs from that of FIG. 7 in that no HyperTransport cycle is launched. As apparent from the chart, the ready signal is kept deasserted by the HyperTransport-to-PCI bridge 200 when placing the retry request. After reasserting the request signal, a command is placed that has a different count value associated.

While the overall operation process according to an embodiment was discussed above with reference to the flowchart of FIG. 5, a more detailed view on the bridge operation process will now be given turning to FIG. 9. In step 900, it is determined whether the command identifier indicates that a memory read process is requested by the PCI device 220. If so, it is determined in step 910 whether the request address and size is already buffered in the command buffer 360. If so, the request was already placed before and is now retried. It is therefore checked in step 920 whether a response is available in the response buffer 370. If a response is available, it is delivered to the PCI device 220 in step 930. If however no response is available, the bridge 200 asserts the retry request signal in step 950 to try to again suppress the request to unblock the interface.

If it is determined in step 910 that the request is placed for the first time, it is checked in step 960 whether there is sufficient space in the request buffer 360 to buffer a request. If so, the command is buffered in step 970, and otherwise, the bridge 200 sends a retry request in step 950. Even if the command can be buffered in step 970, the bridge 200 sends the retry request in step 990 to request that the interface be unblocked.

Figure 9:
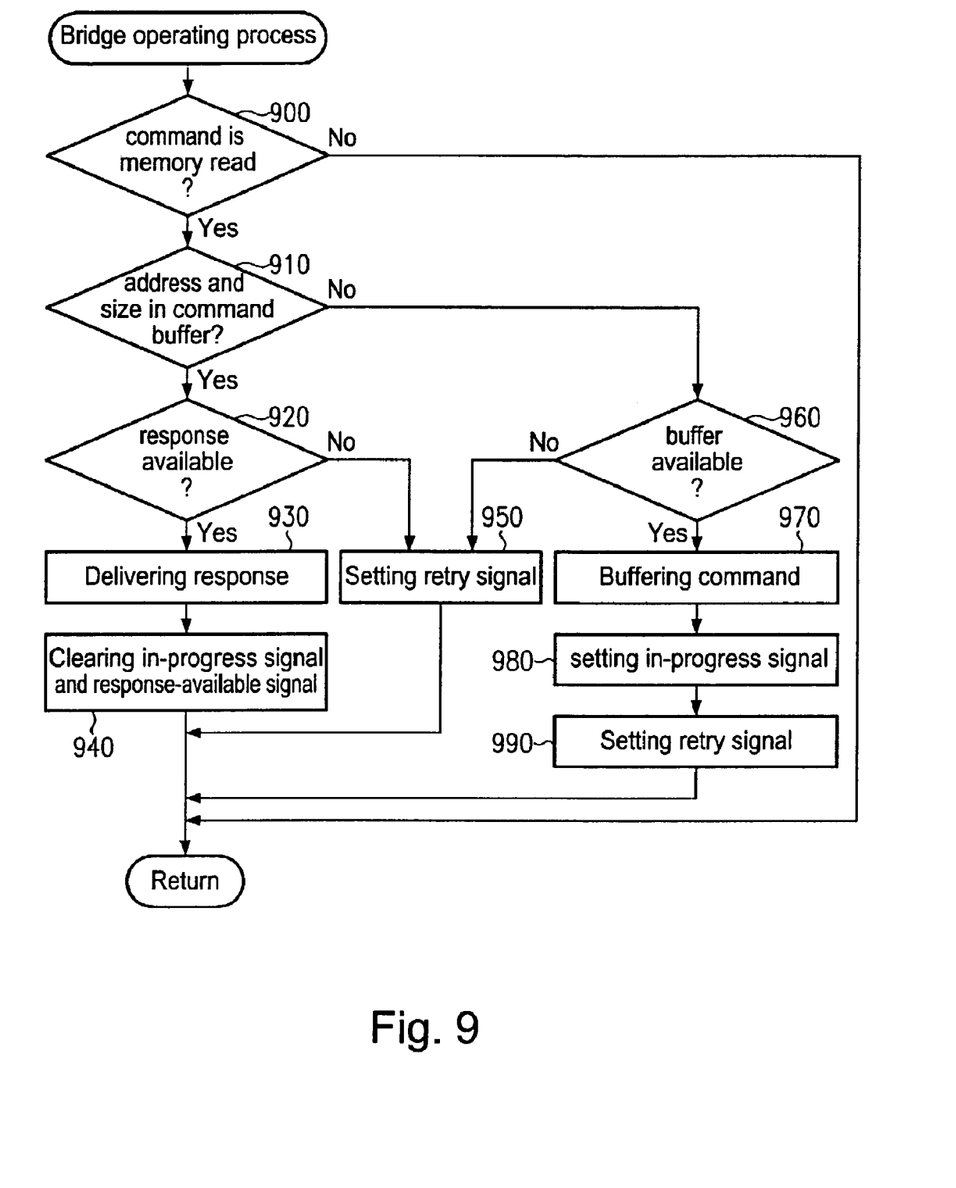
FIG. 9 is a flowchart illustrating the bridge operation process according to an embodiment.

As can be seen from the flowchart of FIG. 9, there may be further signals used for controlling the bridge operation. For instance, an in-progress signal may be set in step 980 and cleared in step 940 for signalling that there is a request still pending. Further, a response-available signal may be used to signal that a response has been received from the host bridge 210. The response-available signal is cleared in step 940 after having delivered the response to the PCI device 220 in step 930.

As apparent from the foregoing discussion of the retry technique according to the embodiments, a host (e.g. a HyperTransport-to-PCI bridge 200) may give a bus master (e.g. a PCI device 220 or one of its subunits) the chance to cancel a bus master memory read request, start another bus master request, and retry the first bus master request. The requesting bus master may or may not use this option. Thus, the bus masters are allowed to ignore the retry request signal. Other requests than bus master memory read requests must not deassert the request signal before the bus master cycle is completed. In the present embodiment, the retry request signal is asserted within the address phase of the bus master.

By adding retry capabilities to the low-speed interface according to the above described embodiments, the overall internal bandwidth usage may be improved by allowing multiple pending requests that are served in a pipeline manner by the host. This may increase the operating speed and improve the efficiency of the data handling.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein.

Accordingly, it is to be understood that the invention is not to be limited by the specific illustrative embodiment, but only the scope of the appended claims.

The invention claimed is:

1. An integrated circuit chip comprising:
an interface circuit connected to a first signal line for receiving requests from at least one requestor, said requests requiring responses to be sent back to the respective requestor, said requests being placed by the respective requestor by asserting a request signal on said first signal line, said request signal being deasserted by the respective requestor when a response is sent back to the respective requestor; and
a request processing circuit connected to process the received requests;
wherein said interface circuit is further connected to a second signal line to send a retry request to the current requestor for requesting the current requestor to deassert its request signal although a response has not yet been sent back, and to reassert the request signal later, and
wherein said interface circuit is further connected to a third signal line to send to the current requestor a ready signal together with said retry request, said ready signal indicating whether the request received from the current requestor could be processed by said request processing circuit, thereby enabling the current requestor to modify its request when retrying, if the initial request received from the respective retrying requestor could not be processed by said request processing circuit.

2. The integrated circuit chip of claim 1, wherein said interface circuit is further adapted to accept modified requests from retrying requestors if the initial request received from the respective retrying requestor could not be processed by said request processing circuit.

3. The integrated circuit chip of claim 1, wherein said requests from said at least one requestor are upstream memory read requests.

4. The integrated circuit chip of claim 3, wherein said interface circuit is adapted to determine whether a current request is a memory read request, wherein no retry request is sent if it is determined that the current request is not a memory read request.

5. The integrated circuit chip of claim 3, wherein said interface circuit is further connected to receive address data from said at least one requestor, said address data specifying a location in memory from which data is requested to be read, wherein said interface circuit is adapted to send said retry request during receipt of said address data.

6. The integrated circuit chip of claim 1, wherein said interface circuit is incapable of supporting split transactions.

7. The integrated circuit chip of claim 1, wherein said interface circuit is adapted to receive requests from multiple independent requestor devices.

8. The integrated circuit chip of claim 1, wherein said interface circuit is adapted to receive requests from multiple bus masters in one requestor device.

9. The integrated circuit chip of claim 1, wherein said interface circuit is adapted to send said retry request to the current requestor as soon as said request processing circuit has processed the current request.

10. The integrated circuit chip of claim 1, wherein said request processing circuit comprises a source interface adapted to send signals corresponding to said received requests to a target device.

11. The integrated circuit chip of claim 10, wherein said source interface is further adapted to receive responses from said target device.

12. The integrated circuit chip of claim 10, wherein said interface circuit is adapted to send said retry request to the current requestor as soon as said source interface has sent a signal corresponding to the current request to said target device.

13. The integrated circuit chip of claim 10, wherein said source interface is a HyperTransport compliant interface.

14. The integrated circuit chip of claim 1, wherein said interface circuit is arranged for determining whether the current request signal has been deasserted after a retry request has been sent although a response has not yet been sent back.

15. The integrated circuit chip of claim 14, wherein said interface circuit is capable of receiving another request if it determines that the current request signal has been deasserted.

16. The integrated circuit chip of claim 14, wherein said interface circuit is incapable of receiving another request if it determines that the current request signal has not been deasserted.

17. The integrated circuit chip of claim 1, further comprising a request buffer for storing data identifying received requests, wherein said interface circuit is adapted to send said retry request to the current requestor if there is no buffer space available to store data identifying the current request.

18. The integrated circuit chip of claim 1, further comprising a request buffer for storing data identifying received requests, wherein said interface circuit is adapted to send said retry request to the current requestor after data identifying the current request has been stored.

19. The integrated circuit chip of claim 1, further comprising a request buffer for storing data identifying received requests, wherein said interface circuit is adapted to send said retry request to the current requestor if data identifying the current request is already stored in the request buffer and no response to that request is presently available.

20. The integrated circuit chip of claim 19, further comprising a response buffer for storing responses to be sent back to requestors, wherein said interface circuit is adapted to determine whether a response to a currently received request is presently available, by accessing said response buffer.

21. The integrated circuit chip of claim 1, wherein said at least one requestor is a PCI (Peripheral Component Interconnect) bus master.

22. The integrated circuit chip of claim 1, being a southbridge chip for use in a computer system.

23. A HyperTransport-to-PCI (Peripheral Component Interconnect) bridge comprising:
   a PCI target interface unit connected to a first signal line for receiving requests from at least one PCI source unit, said requests requiring responses to be sent back to the respective PCI source unit, said requests being placed by the respective PCI source unit by asserting a request signal on said first signal line, said request signal being deasserted by the respective PCI source unit when a response is sent back to the respective PCI source unit; and
   a HyperTransport source interface unit connected to send signals corresponding to said received requests to a HyperTransport compliant target device;
   wherein said PCI target interface unit is further connected to a second signal line to send a retry request to the current PCI source unit for requesting the current PCI source unit to deassert its request signal although a response has not yet been sent back, and to reassert the request signal later, and
   wherein said PCI target interface unit is further connected to a third signal line to send to the current PCI source unit a ready signal together with said retry request, said ready signal indicating whether the request received from the current PCI source unit could be processed by said HyperTransport source interface unit, thereby enabling the current PCI source unit to modify its request when retrying, if the initial request received from the PCI source unit could not be processed by said HyperTransport source interface unit.

24. A southbridge device for bridging a low-speed data channel to a high-speed data channel in a computer system, said southbridge device comprising:
   a low-speed interface unit connected to a first signal line for receiving requests from at least one requestor, said requests requiring responses to be sent back to the respective requestor, said requests being placed by the respective requestor by asserting a request signal on said first signal line, said request signal being deasserted by the respective requestor when a response is sent back to the respective requestor; and
   a high-speed interface unit connected to send signals corresponding to said received requests to an upstream target device;
   wherein said low-speed interface unit is further connected to a second signal line to send a retry request to the current requestor for requesting the current requestor to deassert its request signal although a response has not yet been sent back, and to reassert the request signal later, and
   wherein said low-speed interface unit is further connected to a third signal line to send to the current requestor a ready signal together with said retry request, said ready signal indicating whether the request received from the current requestor could be processed by said high-speed interface unit, thereby enabling the current requestor to modify its request when retrying, if the initial request received from the respective retrying requestor could not be processed by said high-speed interface unit.

25. A PCI (Peripheral Component Interconnect) device comprising:
   a master interface unit connected to a first signal line for sending a request to a PCI target device, said request requiring a response, said master interface unit being adapted to place said request by asserting a request signal on said first signal line and deasserting said request signal when the response is received, said master interface unit being further connected to a second signal line to receive a retry request from said PCI target device, said master interface unit being further connected to a third signal line to receive a ready signal from said PCI target device together with said retry request, said ready signal indicating whether the request sent to said PCI target device could be processed by said PCI target device,
   wherein said master interface unit is capable of deasserting said request signal upon receipt of said retry request although a response has not yet been received, and reasserting the request signal later, and
   wherein said master interface unit is capable of sending a modified request when reasserting the request signal, if the ready signal indicated that the request sent to said PCI target device could not be processed by said PCI target device, thereby enabling the master interface unit to modify its request when retrying, if the initial request received from the master interface unit could not be processed by said PCI target device.

26. The PCI device of claim 25, wherein said request to said PCI target device is an upstream memory read request.

27. The PCI device of claim 26, wherein said master interface unit is further connected to send address data to said PCI target device, said address data specifying a location in memory from which data is requested to be read, wherein said master interface unit is adapted to receive said retry request during transmission of said address data.

28. The PCI device of claim 25, wherein said master interface unit is adapted to determine upon receipt of said retry request whether a current request is a memory read request, wherein a received retry request is ignored if it is determined that the current request is not a memory read request.

29. The PCI device of claim 25, wherein said master interface unit is capable of sending requests from multiple bus masters within said PCI device.

30. The PCI device of claim 25, adapted to send said request to a southbridge chip of a computer system.

31. A method of operating an integrated circuit chip, the method comprising:
receiving requests from at least one requestor, said requests requiring responses to be sent back to the respective requestor, said requests being placed by the respective requestor by asserting a request signal, said request signal being deasserted by the respective requestor when a response is sent back to the respective requestor; and
processing the received requests;
wherein method further comprises:
sending a retry request to the current requestor for requesting the current requestor to deassert its request signal although a response has not yet been sent back, and to reassert the request signal later; and
sending a ready signal to the current requestor together with said retry request, said ready signal indicating whether the request received from the current requestor could already be processed, thereby enabling the current requestor to modify its request when retrying, if the initial request received from the respective retrying requestor could not be processed.

32. The method of claim 31, wherein said requests from said at least one requestor are upstream requests.

33. The method of claim 31, wherein said requests from said at least one requestor include memory read requests.

34. The method of claim 33, further comprising:
determining whether a current request is a memory read request; and
if the current request is not a memory read request, refraining from sending a retry request.

35. The method of claim 33, further comprising:
receiving address data from said at least one requestor, said address data specifying a location in memory from which data is requested to be read;
wherein said retry request is sent during receipt of said address data.

36. The method of claim 31, wherein receiving requests from at least one requestor comprises:
receiving requests from multiple independent requestor devices.

37. The method of claim 31, wherein receiving requests from at least one requestor comprises:
receiving requests from multiple bus masters in one requestor device.

38. The method of claim 31, wherein said retry request is sent to the current requestor as soon as the current request has been processed.

39. The method of claim 31, further comprising:
sending signals corresponding to said received requests to a target device.

40. The method of claim 39, further comprising:
receiving responses from said target device.

41. The method of claim 39, wherein said retry request is sent to the current requestor as soon as a signal corresponding to the current request has been sent to said target device.

42. The method of claim 39, wherein said target device is a HyperTransport compliant target device.

43. The method of claim 31, further comprising:
determining whether the current request signal has been deasserted after a retry request has been sent although a response has not yet been sent back.

44. The method of claim 43, further comprising:
receiving another request if it determines that the current request signal has been deasserted.

45. The method of claim 43, further comprising:
receiving no further request if it determines that the current request signal has not been deasserted.

46. The method of claim 31, further comprising:
storing data identifying received requests in a request buffer,
wherein said retry request is sent to the current requestor if there is no buffer space available to store data identifying the current request.

47. The method of claim 31, further comprising:
storing data identifying received requests in a request buffer,
wherein said retry request is sent to the current requestor after data identifying the current request has been stored.

48. The method of claim 31, further comprising:
storing data identifying received requests in a request buffer,
wherein said retry request is sent to the current requestor if data identifying the current request is already stored in the request buffer and no response to that request is presently available.

49. The method of claim 48, further comprising:
storing responses to be sent back to requestors in a response buffer; and
determining whether a response to a currently received request is presently available, by accessing said response buffer.

50. The method of claim 31, wherein said at least one requestor is a PCI (Peripheral Component Interconnect) bus master.

51. The method of claim 31, for operating a southbridge chip for use in a computer system.

52. A method of operating a PCI (Peripheral Component Interconnect) device, the method comprising:
sending a request from a source device to a PCI target device by asserting a request signal, said request requiring a response;
receiving a retry request and a ready signal from said PCI target device, said ready signal indicating whether the request sent to said PCI target device could be processed by said PCI target device;
determining whether to deassert said request signal although a response has not yet been received, and if so, deasserting the request signal and reasserting it later; and
deasserting said request signal when the response is received,
wherein reasserting the request signal comprises determining whether to send a modified request if the ready signal indicated that the request sent to said PCI target device could not be processed by said PCI target device, thereby enabling the device to modify its request when retrying, if the initial request received from the source device not be processed by said PCI target device.

53. The method of claim 52, wherein said request to said PCI target device is an upstream memory read request.

54. The method of claim 53, further comprising:
sending address data to said PCI target device, said address data specifying a location in memory from which data is requested to be read,
wherein said retry request is received during transmission of said address data.

55. The method of claim 52, wherein determining whether to deassert said request signal comprises:
determining upon receipt of said retry request whether a current request is a memory read request,
wherein a received retry request is ignored if it is determined that the current request is not a memory read request.

56. The method of claim 52, wherein the method comprises:
sending requests from multiple bus masters within said PCI device.

57. The method of claim 52, wherein sending said request to a PCI target device comprises:
sending said request to a southbridge chip of a computer system.

58. A computer system comprising:
a PCI (Peripheral Component Interconnect) device; and
a southbridge connected to said PCI device,
wherein said PCI device is capable of sending a request to said southbridge by asserting a request signal, said southbridge is capable of sending a response back to said PCI device, and said PCI device is arranged to deassert said request signal when receiving said response,
wherein said southbridge is further arranged to send a retry request to said PCI device for requesting said PCI device to deassert its request signal although a response has not yet been sent back, and to reassert the request signal later,
wherein said southbridge is further arranged to send a ready signal to said PCI device together with said retry request, said ready signal indicating whether the request received from the PCI device could be processed, thereby enabling the PCI device to modify its request when retrying, if the initial request received from the PCI device could not be processed by said southbridge.

* * * * *